US009587626B2

(12) United States Patent
Sadaba et al.

(10) Patent No.: US 9,587,626 B2
(45) Date of Patent: Mar. 7, 2017

(54) CONTROL SYSTEM AND METHOD FOR A WIND TURBINE GENERATOR

(75) Inventors: Oscar Alonso Sadaba, Sarriguren (ES); Teresa Arlaban Gabeiras, Sarriguren (ES); Ricardo Royo García, Sarriguren (ES); Miguel Núñez Polo, Sarriguren (ES)

(73) Assignee: Acciona Windpower, S.A., Sarriguren (Navarra) (ES)

( * ) Notice: Subject to any disclaimer, the term of this patent is extended or adjusted under 35 U.S.C. 154(b) by 1633 days.

(21) Appl. No.: 12/602,508

(22) PCT Filed: May 8, 2008

(86) PCT No.: PCT/ES2008/000329
§ 371 (c)(1),
(2), (4) Date: Jun. 15, 2010

(87) PCT Pub. No.: WO2008/145778
PCT Pub. Date: Dec. 4, 2008

(65) Prior Publication Data
US 2010/0256829 A1 Oct. 7, 2010

(30) Foreign Application Priority Data
Jun. 1, 2007 (ES) .................................. 200701511

(51) Int. Cl.
*G06F 1/26* (2006.01)
*F03D 7/02* (2006.01)
(Continued)

(52) U.S. Cl.
CPC ............ *F03D 7/02* (2013.01); *F03D 7/0272* (2013.01); *F03D 9/002* (2013.01); *H02P 9/007* (2013.01);
(Continued)

(58) Field of Classification Search
CPC .................. H02P 9/007; H02P 2101/15; F05B 2270/1091; F05B 2270/3032;
(Continued)

(56) References Cited

U.S. PATENT DOCUMENTS

2007/0073445 A1* 3/2007 Llorente Gonzalez et al. ............................ 700/286
2007/0273155 A1* 11/2007 Barton et al. .................... 290/44

FOREIGN PATENT DOCUMENTS

WO WO 2005099063 A1 * 10/2005

OTHER PUBLICATIONS

International Search Report issued Oct. 8, 2008 in International (PCT) Application No. PCT/ES2008/000329.
(Continued)

Primary Examiner — Tulsidas C Patel
Assistant Examiner — Viet Nguyen
(74) Attorney, Agent, or Firm — McNees Wallace & Nurick LLC

(57) ABSTRACT

Control system and method for a wind turbine generator, such wind turbine being a variable speed turbine and having a doubly fed induction generator, said control system comprising means for determining the operating temperature of the different subsystems, having the means for dividing the generation of reactive power, both inductive and capacitive, between the stator (3) and the network side converter (6), based on the criterion of keeping every subsystem operating temperature as far away as possible from its corresponding limit, the method comprising the following steps: determine the electrical elements temperature; calculate the closeness of those temperatures to each element corresponding limit temperature; and distribute the reactive power production between the stator (3) and the network side converter (6),
(Continued)

based on the criterion of keeping every subsystem operating temperature as far as possible from its corresponding limit.

16 Claims, 2 Drawing Sheets

(51) Int. Cl.
*F03D 9/00* (2016.01)
*H02P 9/00* (2006.01)
*H02P 101/15* (2015.01)

(52) U.S. Cl.
CPC ............... *F05B 2220/70646* (2013.01); *F05B 2270/1091* (2013.01); *H02P 2101/15* (2015.01); *Y02E 10/723* (2013.01); *Y02E 10/725* (2013.01)

(58) Field of Classification Search
CPC ...... F05B 2270/303; Y02E 40/30; H02J 3/16; H02J 3/18; F03D 7/02; F03D 7/0272; F03D 9/002
USPC ...................... 290/44, 55; 700/286, 287, 288
See application file for complete search history.

(56) References Cited

OTHER PUBLICATIONS

Helle, Lars, "*Modeling and Comparison of Power Converters for Doubly Fed Induction Generators in Wind Turbines*", Ph.D. Thesis, Aalborg University Institute of Energy Technology, Apr. 10, 2007, paragraphs 2.4, 3.4, 3.5 and 3.6, ISBN 978-87-89179-66-7, Retrieved on Oct. 2, 2008, <URL:http://vbn.aau.dk/ws/fbspretrieve/14466775/final_thesis_lars_helle.pdf>.

Hansen, Anca D., et al., "*Co-ordinated Voltage Control of DFIG Wind Turbines in Uninterrupted Operation during Grid Faults*", Wind Energy, 2007, 10, pp. 51-68, Aug. 10, 2006, Wiley Interscience, DOI: 10.1002/WE.207.

Tang, Yifan, et al., "*A Flexible Active and Reactive Power Control Strategy for a Variable Speed Constant Frequency Generating System*", IEEE, Transactions on Power Electronics, vol. 10, No. 4, Jul. 1995.

Tapia, A., et al., "*Reactive Power Control of a Wind Farm made up with Doubly Fed Induction Generators(I)*", IEEE. Porto Power Tech Conference, Sep. 2001.

\* cited by examiner

CONTROL SYSTEM AND METHOD FOR A WIND TURBINE GENERATOR

OBJECT OF THE INVENTION

As stated in the title of this descriptive specification, the following invention relates to a control system for a wind turbine, such wind turbine being a variable speed turbine and having a doubly fed induction generator, by means of which the reactive power production is distributed between the stator and the network side converter.

Said distribution is carried out based on the criterion of keeping all the subsystems operating temperature as far as possible from their corresponding limits.

So, the aim of the present invention is to disclose a control system by which the demanded reactive power is generated using both capacities, distributing said reactive power production (both inductive and capacitive) with the criterion of keeping every subsystem operating temperature as far as possible from its corresponding limit, thereby extending every subsystem life time.

FIELD OF THE INVENTION

This specification describes a control system for application in variable speed wind turbines which incorporate a doubly fed induction generator.

BACKGROUND OF THE INVENTION

In terms of documents having a relation with the object of the invention we can consider U.S. Pat. No. 5,083,039 which describes a machine with stator control in which the stator of that machine is connected to a converter, said converter being capable of injecting into the electrical network with the demanded power factor.

Also, patent EP 1508951 A1 describes a system and a method by which a set of generators generates the active and reactive power demanded by a control system, with each generator demand values being generated bearing in mind its voltage limits and the electrical generator thermal capacity. The network side converters in that system can also generate reactive power Dimitrius Arsudis Ph.D. thesis, "Doppeltgespeister Drehstromgenerator mit Spannungszwischenkreis-Umrichter im Rotorkreis für Windkraftanlagen", describes a doubly fed induction machine control method by which the demanded amount of reactive power is generated in the stator of the machine by controlling the rotor currents in an appropriate manner.

DESCRIPTION OF THE INVENTION

The present specification describes a control system for a wind turbine, such wind turbine being a variable speed turbine and having a doubly fed induction generator, that establishes a distribution of the reactive power production, both inductive and capacitive, between the stator and the network side converter based on the criterion of keeping all the subsystems (electrical components) operating temperature as far as possible from their corresponding limits, thereby extending the life time of those subsystems.

The elements constituting the electrical system are grouped into several subsystems where each subsystem components have a similar thermal behavior at a certain reactive power distribution.

Those subsystems are:
the stator;
the rotor, the rotor side converter and any other component electrically connected between both, and;
the network side converter and any other component between the converter and the electrical network.

Each component thermal state is characterized by an index (t_x) which indicates the closeness of its present temperature, measured or estimated, to its maximum operating temperature.

The reactive energy production distribution is carried out considering the components having a greater index (t_x) in each group, and in accordance with certain distributions coefficients associated with each subsystem that minimize their losses, said coefficients being previously calculated as a function of the reactive power demand, the present level of active power and voltage and the machine PQTV curves.

The reactive power distribution is cyclically calculated using either a linear regulator or a non-linear one based on thresholds and hysteresis.

Said reactive power production distribution is interrupted in the event of a network fault, going over to a reactive power demand adequate to support the network recovery and prevent from the machine disconnection, said distribution being resumed when the network fault is solved.

A further object of the invention is a wind turbine control method comprising the following steps;
determine the elements temperature,
calculate the closeness of those temperatures to each element corresponding limit temperature,
distribute the reactive power production (both inductive and capacitive) between the stator and the network side converter based on the criterion of keeping all the subsystems operating temperature as far as possible from their corresponding limits.

It likewise furthermore comprises the step of grouping the electrical elements into various subsystems where each subsystem components have a similar thermal behavior at a certain reactive power distribution.

So, those subsystems are:
the stator;
the rotor, the rotor side converter and any other component electrically connected between both, and;
the network side converter and any other component between the converter and the electrical network.

Each component thermal state is characterized by an index (t_x) which indicates the closeness of its present temperature, measured or estimated, to its maximum operating temperature.

The reactive energy production distribution is carried out considering the components having a greater index (t_x) in each group, and in accordance with certain distributions coefficients associated with each subsystem that minimize their losses, said coefficients being previously calculated as a function of the reactive power demand, the present level of active power and voltage and the machine PQTV curves.

When the t_x index of all the subsystems is below a certain threshold, the distribution coefficient becomes the one that optimizes the overall system efficiency.

The reactive power distribution is cyclically calculated using either a linear regulator or a non-linear one based on thresholds and hysteresis.

Said reactive power production distribution is interrupted in the event of a network fault, going over to a reactive power demand adequate to support the network recovery and prevent from the machine disconnection, said distribution being resumed when the network fault is solved.

In order to complement the description that is going to be made forthwith, and with the aim of facilitating a better understanding of the characteristics of this invention, this specification is accompanied by a set of drawings in which, on an illustrative rather than limiting basis, the most characteristic details of the invention have been represented.

DESCRIPTION OF A PREFERRED EMBODIMENT

Figure 1:
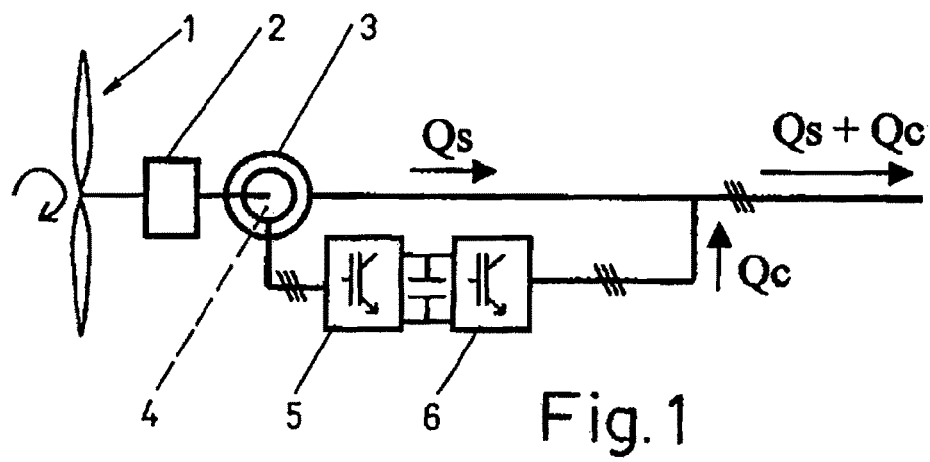
FIG. 1. Shows a variable speed wind turbine based on a doubly fed induction generator.

With the commented figures in view and in accordance with the numbering adopted, we can see a variable speed wind turbine based on a doubly fed induction generator comprising:
- a rotor 1;
- a gearbox 2;
- a generator in which the stator 3 and the rotor 4 can be distinguished, and;
- a converter comprising two parts, the rotor side converter and the network side converter 6.

In the case of medium or high voltage generators, a transformer 7 is furthermore incorporated which manages all the power generated or consumed by the rotor.

Figure 2:
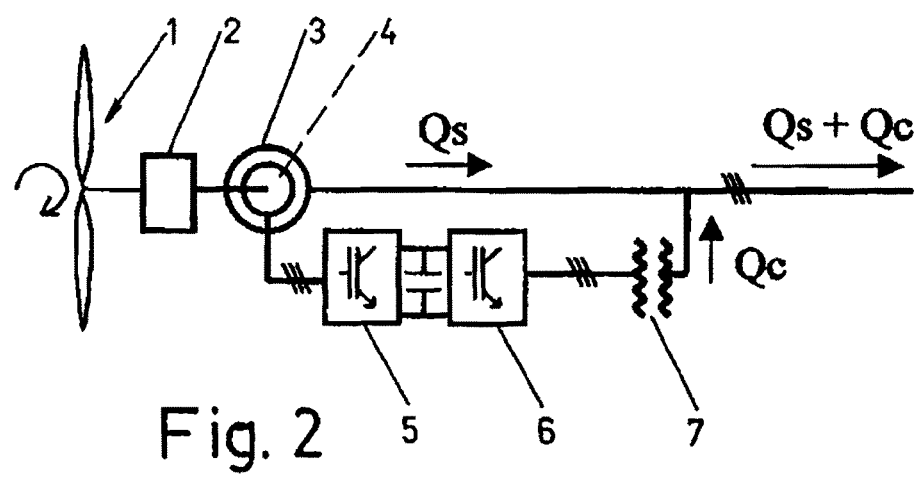
FIG. 2. Shows a variable speed wind turbine based on a doubly fed induction generator, the stator generating at medium or high voltage.

As shown in FIGS. 1 and 2, the stator of the electrical machine generates a reactive power Qs, while the network side converter generates a reactive power Qc, where both can be positive (capacitive power factor) or negative (inductive power factor) and not necessarily having the same sign. The total reactive power generated by the wind turbine generator will be resultant of summing both components.

The control system aim will be to calculate a distribution coefficient α which determines the quantity and sign of the reactive power generated by the stator and the converter, according to the following expressions:

$$Q_{[[s]]ref} = \alpha Q_{sm}$$

$$Q_{cref} = Q_{ref} - Q_{sref}$$

Where Qref is the global reactive power production demand to the wind turbine generator, Qsm is the stator maximum capacity for reactive power production, Qsref the calculated stator reactive power demand and Qcref the calculated network side converter reactive power demand, these last two values being calculated as a function of the distribution coefficient α which can take values between −1 and +1.

Figure 3:
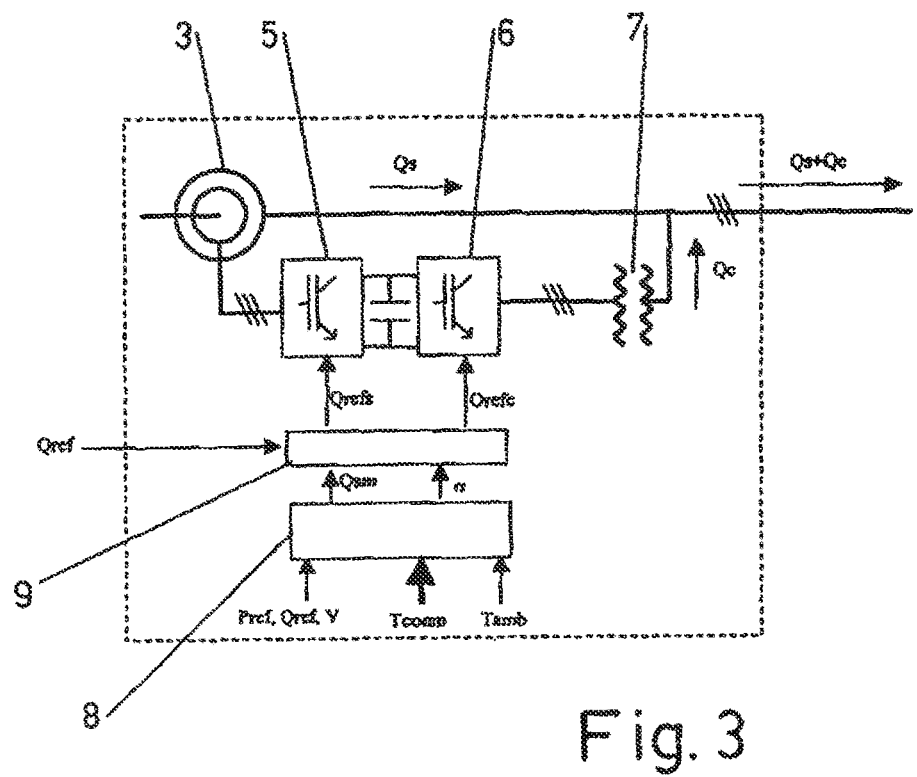
FIG. 3. Shows a basic control diagram of the present invention.

In FIG. 3 a basic diagram of the present invention is represented, where in module 8 distribution coefficient α calculation is carried out.

As a function of both said distribution coefficient and the global reactive power production demand (Qref), reactive power demand values for the stator (Qsref) and for the network side converter (Qcref) are calculated in module 9.

Having as a demand value Qsref, the rotor side converter 5 will generate the appropriate currents in the rotor of the generator so that the stator produces the demanded reactive power.

The electrical components described above can be grouped into various subsystems, where each subsystem components have similar thermal behavior at a certain reactive power distribution.

So, in a preferred embodiment, three different subsystems can be distinguished:
- the stator 3.
- the rotor 4, the rotor side converter 5 and any other component electrically connected between both.
- the network side converter 6 and any other component between the converter and the electrical network such as for example a transformer 7 in the case of medium and high voltage generators.

Figure 4:
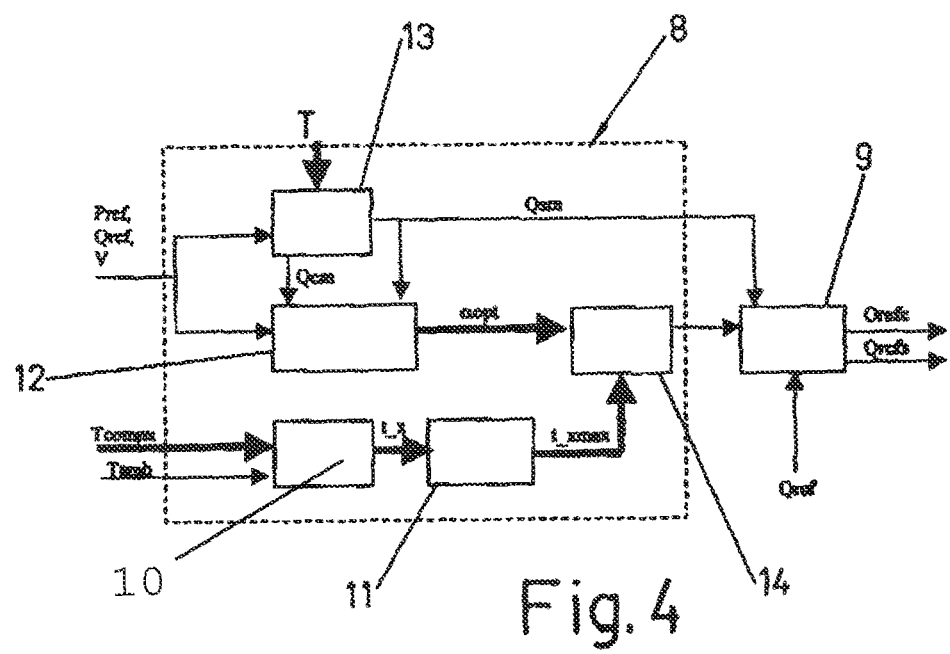
FIG. 4. Shows a detailed control diagram, according to a preferred embodiment, of the present invention.

FIG. 4 shows a preferred embodiment of the control system of the present invention.

According to that embodiment, an index (t_x) is calculated in module 10 for each component which reflects the closeness of its present temperature to its maximum operating temperature.

According to said preferred embodiment, said index would be calculated as follows:

$$t\_x = \frac{Tcompx - Tamb}{Tmax. - Tamb}$$

Where Tcomp is component "x" temperature (measured or estimated), Tamb is the ambient temperature and Tmax is that component maximum operating temperature.

Either the temperature at the nacelle or that at the tower base will be taken as the ambient temperature depending on where each component is located.

In module 11 of FIG. 4, as the value indicating each subsystem heating, the index (t_x) of the component that is closest to its maximum value is taken, or, which is the same thing, the one whose index is closest to 1.

According to a preferred embodiment described in FIG. 4, in module 12, a distribution coefficient $\alpha_{opt}$ is calculated for each subsystem which minimizes that subsystem losses.

It is also determined a coefficient $\alpha_{opt}$ that optimizes the overall system efficiency. The value of these coefficients is obtained from pre-programmed curves previously obtained based on technical studies and experimental analysis conducted on the specific generation system to control.

These curves have the reactive power demand, the present level of active power and the voltage as input data. For this, module 12 takes into account the stator maximum reactive power production capacity Qsm, and the converter maximum reactive power production capacity Qcm, which both depend on the active power, network voltage and ambient temperature where those components are located (PQTV curves).

According to a preferred embodiment and as indicated in FIG. 4, in module 14 the distribution coefficient α is cyclically calculated, aiming to modify it towards the value $\alpha_{opt}$ which reduces losses in the subsystem having the greatest index (t_x), and which therefore has the component that is closest to its limit temperature at that moment.

Nevertheless, when all the subsystems are thermally far away from their corresponding limits, the target coefficient becomes the one that optimizes the overall system efficiency. Said evolution of the distribution coefficient can be done by means of a linear regulator (PID or similar) or a non-linear algorithm based on thresholds and hysteresis.

For any regulation method commented on, module 14 also determines the minimum and maximum limits of α as a function of the present operating conditions. The value of α thus calculated will have to be saturated in order to remain always within the permitted interval.

In the case of network events such as voltage dips, overvoltages, undervoltages or others, the described reactive power distribution is temporarily interrupted, going over to a reactive power demand adequate (in quantity and sign) to support the network recovery and prevent from the machine disconnection.

Once the said network event has been solved, the control system for the reactive power distribution of the present invention resumes the state previous to the network event.

Likewise described is a control method for a wind turbine generator which is based on determining the electrical elements temperature, calculating the closeness of those temperatures to each element corresponding limit temperature and distributing the reactive power production (both inductive and capacitive) between the stator 3 and the network side converter 6, based on the criterion of keeping every subsystem operating temperature as far as possible from its corresponding limit.

It also includes the step of classifying the constituent elements of the electrical system, grouping them into various subsystems where each subsystem components have a similar thermal behavior at a certain reactive power distribution.

Those subsystems are the stator 3; the rotor 4, the rotor side converter 5 and any other component electrically connected between both; as well as the network side converter 6 and any other component between the converter and the electrical network.

Each component thermal state of is characterized by an index (t_x) which reflects the closeness of its present temperature, measured or estimated, to its maximum operating temperature.

The reactive energy production distribution is carried out considering the components having a greater index (t_x) in each group, and in accordance with certain distributions coefficients associated with each subsystem that minimize their losses, said coefficients being previously calculated as a function of the reactive power demand, the present level of active power and voltage and the machine PQTV curves.

When the t_x index of all the subsystems is below a certain threshold, the distribution coefficient becomes the one that optimizes the overall system efficiency.

The reactive power distribution is cyclically calculated using either a linear regulator or a non-linear one based on thresholds and hysteresis.

Said reactive power production distribution is interrupted in the event of a network fault, going over to a reactive power demand adequate to support the network recovery and prevent from the machine disconnection, said distribution being resumed when the network fault is solved.

The invention claimed is:

1. Control system for a wind turbine, such wind turbine being a variable speed turbine provided with a doubly fed induction generator having a stator and a rotor, the control system comprising:
a converter including a rotor side converter connected with the generator rotor, and a network side converter adapted to be connected to a power distribution network;
a temperature determination module configured for measuring and/or estimating the operating temperature of electrical components at least of the converter and the generator;
a reactive power distribution module configured to cyclically calculate a distribution of reactive power production demand values for the stator and for the network side converter, to meet a global reactive power production demand, demanded to the wind turbine generator; and
wherein distribution module is additionally configured to modify the distribution of reactive power production between the stator and the network side converter, based on the temperature determined by the temperature determination module, in order to reduce the operating temperature of the electrical component whose temperature is closest to a limit temperature.

2. Control system for a wind turbine, according to claim 1, further comprising an optimum computation module to calculate an optimum reactive power production distribution (.alpha. opt) that minimizes the losses in that component whose temperature is closest to its limit, said optimum reactive power production distribution being calculated as a function of the active power demand, (PreQ) the reactive power demand, (QreQ) and a network voltage (V) and in that the distribution module is configured to modify the reactive power production distribution (.alpha.) towards said optimum reactive power production distribution (.alpha.-opt).

3. Control system for a wind turbine, according to claim 2, wherein the control system stores pre-programmed values on the basis of which the optimum computation module calculates the optimum reactive power production distribution (.alpha.opt).

4. Control system for a wind turbine, according to claim 3, wherein the calculation of the optimum reactive power production distribution (.alpha. opt) is made taking into account a maximum reactive power production capacities of the stator (Qsm) and a line side converter (Qcm), which are calculated as a function of the active power demand, the network voltage and a ambient temperature in where those components are located.

5. Control system for a wind turbine, according to claim 4, wherein the distribution module is a regulator selected from the group consisting of a liner regulator and a non-linear regulator, based on thresholds and hysteresis.

6. Control system for a wind turbine, according to claim 5, wherein the closeness of the component temperature (Tcomp x) to its limit temperature (Tmax) is characterized by an index (t x) equaling the component temperature (Tcomp x) less the ambient temperature (Tamb), normalized by the limit temperature (Tmax) less the ambient temperature (Tamb).

7. Control system for a wind turbine, according to claim 6, wherein the electric elements constituting the control system are grouped into various subsystems where each subsystem components have an equivalent thermal behavior at any reactive power production distribution (.alpha.), said subsystems being as follows: the stator; a rotor, a rotor side converter and any other component electrically connected between both; and, the network side converter and any other component between the converter and the electrical network, and in that the reactive power production distribution (.alpha.) is calculated considering the component of each subsystem with greatest heating index (t x).

8. Control system for a wind turbine, according to claim 6, characterized in that when the index (t x) of all the subsystems is below a threshold, the optimum computation module is configured to calculate the optimum reactive power production distribution (.alpha. opt) that optimizes the global efficiency of the system based on pre-programmed values, the active and reactive power demand and the network voltage, and in that the distribution module is configured to modify the reactive power production distribution (.alpha.) towards said optimum reactive power production distribution (.alpha. opt).

9. Control method for a variable speed wind turbine, provided with a doubly fed induction generator having a rotor and a stator, and a converter including a rotor side converter connected to the generator rotor, and a network side converter adapted to be connected to power distribution network, wherein said control method is carried out cyclically and comprises the following steps:

determining the operating temperature of electrical components at least of the converter and the generator by means of measuring and/or estimating, and calculating the closeness of those temperatures to each electric component corresponding limit temperature, and selecting the electric component whose operating temperature is closest to the limit;

distributing the production of reactive power between the stator and the network side converter, to meet a global reactive power production demanded to the wind turbine generator; and additionally distributing the production of reactive power between the stator and the network side converter, based on the temperature determined by the temperature determination module, in order to reduce the operating temperature of the electric component whose temperature is closest to its limit temperature.

10. Control method for a wind turbine, according to claim 9, further comprising the step of calculating the optimum reactive power production distribution (.alpha. opt) that minimizes the losses in that component whose temperature is closest to its limit, as a function of the active power demand (Pref), the reactive power demand (Qref), and the voltage (V), and in that the reactive power production distribution (.alpha.) is modified towards said optimum reactive power production distribution (.alpha. opt).

11. Control method for a wind turbine, according to claim 10, wherein the optimum reactive power production distribution (.alpha. opt) is calculated based on pre-programmed values.

12. Control method for a wind turbine, according to claim 11, wherein said control method calculates the maximum reactive power production capacities of the stator (Qsm) and the line side converter (Qcm) on the basis of the active power demand, the network voltage and the ambient temperature where those components are located, said limits being applied in the calculation of the new reactive power production distribution (.alpha.), with which new values of reactive power production (Qsref and QcreQ) are generated.

13. Control method for a wind turbine, according to claim 12, wherein the new reactive power production distribution (.alpha.) is calculated in the block cyclically using a regulator from the group consisting of the linear regulator and the non-linear regulator based on thresholds and hysteresis, starting from the optimum reactive power production distribution (.alpha. opt).

14. Control method for a wind turbine, according to claim 13, wherein the closeness of the component temperature (Tcomp x) to its limit temperature (Tmax) is characterized by means of the index &x), calculated as the difference between the limit temperature (Tmax) and that of the component (Tcomp x), normalized by the difference between the limit temperature (Tmax) and the ambient temperature (Tamb).

15. Control method for a wind turbine, according to claim 14, further comprising the step of grouping the electrical elements into various subsystems where each subsystem components have an equivalent thermal behavior at any reactive power production distribution (.alpha.) said subsystems being as follows: the stator; the rotor, the rotor side converter and any other component electrically connected between both; and, the network side converter and any other component between the converter and the electrical network, and in that reactive power production distribution (.alpha.) is calculated considering the component of each subsystem with greatest heating index (t x).

16. Control method for a wind turbine, according to claim 14, further comprising the step of, when the index (t x) of all the subsystems is below a threshold, calculating the optimum reactive power production distribution (.alpha. opt) that optimizes the global efficiency of the system based on the preprogrammed values, the active and reactive power demand and the voltage, and modifying the reactive power production distribution (.alpha.) towards said optimum reactive power production distribution (.alpha. opt).

\* \* \* \* \*